United States Patent
Piszczek et al.

(10) Patent No.: US 9,959,062 B1
(45) Date of Patent: May 1, 2018

(54) LOW LATENCY AND REDUCED OVERHEAD DATA STORAGE SYSTEM AND METHOD FOR SHARING MULTIPLE STORAGE DEVICES BY HIGH PERFORMANCE COMPUTING ARCHITECTURES

(71) Applicant: DATADIRECT NETWORKS, INC., Chatsworth, CA (US)

(72) Inventors: Michael J. Piszczek, Laurel, MD (US); Jason M. Cope, Highland, MD (US)

(73) Assignee: DataDirect Networks, Inc., Chatsworth, CA (US)

( * ) Notice: Subject to any disclaimer, the term of this patent is extended or adjusted under 35 U.S.C. 154(b) by 140 days.

(21) Appl. No.: 15/016,696

(22) Filed: Feb. 5, 2016

(51) Int. Cl.
| | |
|---|---|
| G06F 11/00 | (2006.01) |
| G06F 3/06 | (2006.01) |
| G06F 11/16 | (2006.01) |
| G06F 11/20 | (2006.01) |

(52) U.S. Cl.
CPC .......... *G06F 3/0619* (2013.01); *G06F 3/0644* (2013.01); *G06F 3/0647* (2013.01); *G06F 3/0659* (2013.01); *G06F 3/0689* (2013.01); *G06F 11/1662* (2013.01); *G06F 11/1666* (2013.01); *G06F 11/2094* (2013.01); *G06F 2201/805* (2013.01)

(58) Field of Classification Search
CPC ............... G06F 3/0619; G06F 11/2094; G06F 11/1666; G06F 11/1662; G06F 3/0644; G06F 3/0689; G06F 3/0647; G06F 3/0659; G06F 2201/805
USPC .......................................................... 714/6.3
See application file for complete search history.

(56) References Cited

U.S. PATENT DOCUMENTS

| | | | |
|---|---|---|---|
| 6,493,804 B1 * | 12/2002 | Soltis .................. | G06F 12/0815 707/999.009 |
| 7,590,672 B2 * | 9/2009 | Slik ........................ | G06F 3/0605 |
| 8,694,563 B1 * | 4/2014 | Cameron .......... | G06F 17/30138 707/812 |
| 2013/0073519 A1* | 3/2013 | Lewis ............... | G06F 17/30215 707/610 |
| 2014/0108473 A1 | 4/2014 | Nowoczynski et al. | |
| 2014/0108707 A1 | 4/2014 | Nowoczynski et al. | |
| 2014/0108723 A1 | 4/2014 | Nowoczynski et al. | |
| 2014/0108863 A1 | 4/2014 | Nowoczynski et al. | |
| 2014/0351300 A1 | 11/2014 | Uppu et al. | |

(Continued)

*Primary Examiner* — Yair Leibovich
(74) *Attorney, Agent, or Firm* — Rosenberg, Klein & Lee

(57) ABSTRACT

A data migration system supports a low-latency and reduced overhead data storage protocol for data storage sharing in a non-collision fashion which does not require inter-communication and permanent arbitration between data storage controllers to decide on the data placement/routing. The multiple data fragments of data sets are prevented from routing to the same storage devices by a multi-step selection protocol which selects (in a first phase of the selection routine) a healthy highest ranked drive enclosure, and further selects (in a second phase of the selection routine) a healthy highest-ranked data storage controller residing in the selected drive enclosure, for routing data fragments to different storage pools assigned to the selected data storage devices for exclusive "writing" and data modification. The selection protocol also contemplates various failure scenarios in a data placement collision free manner.

17 Claims, 10 Drawing Sheets

(56) References Cited

U.S. PATENT DOCUMENTS

| | | | | |
|---|---|---|---|---|
| 2015/0286423 A1* | 10/2015 | Akirav | ............ | G06F 3/0619 |
| | | | | 711/103 |
| 2015/0286424 A1* | 10/2015 | Dain | ............ | G06F 3/0619 |
| | | | | 711/103 |
| 2015/0286427 A1* | 10/2015 | Akirav | ............ | G06F 3/0619 |
| | | | | 711/103 |
| 2016/0124657 A1* | 5/2016 | Resch | ............ | G06F 3/065 |
| | | | | 711/114 |
| 2016/0132699 A1* | 5/2016 | Miller | ............ | G06F 21/80 |
| | | | | 713/193 |
| 2016/0320975 A1* | 11/2016 | Furuya | ............ | G06F 3/065 |
| 2017/0116095 A1* | 4/2017 | Schatz | ............ | G06F 11/2033 |

\* cited by examiner

LOW LATENCY AND REDUCED OVERHEAD DATA STORAGE SYSTEM AND METHOD FOR SHARING MULTIPLE STORAGE DEVICES BY HIGH PERFORMANCE COMPUTING ARCHITECTURES

FIELD OF THE INVENTION

The present system and method are directed to data migration between high performance computing architectures (also referred to herein as data generating entities, clients, hosts, as well as compute nodes) and long-term data storage. In particular, the subject system relates to a data migration system attaining low operation latency and reduced overhead required for data modification by implementing a data migration strategy which avoids intercommunication between storage controllers.

More in particular, the present method and system relate to data migration protocol employing multiple storage controllers configured to share multiple storage devices without continuous arbitration for "write" I/O operations, and supporting a data migration routine which prevents the storage controllers from placing multiple data shards (fragments) of the same RAID stripe on the same storage device, thus avoiding data placement collisions and thereby protecting data integrity in case of a storage device failure.

In overall concept, the present system and method embrace the I/O (Input/Output) activity in a data migration system which is equipped with a data storage sharing mechanism which is configured to have the capability of selecting a storage controller node for servicing a particular portion (fragment) of a data "write" request received from a compute node and for writing the particular data portion (fragment) to a storage device entity assigned exclusively to the selected storage controller node.

The present invention is further directed to a data storage system, where data storage devices are dynamically divided into a number of separate data storage pools, and where each storage controller node is assigned to a respective data storage pool for exclusive "write" I/O operations. Upon receiving a request from a client (compute node) for writing a data set (for example, a RAID stripe), each shard (fragment) contained in the data set is sent to a different storage controller node to be stored in the storage pool assigned to the storage controller node in question, thus assuring that the shards of the data set are written on different data storage devices without occupying the storage controller nodes with arbitrating therebetween on the data shards (fragments) placement.

In addition, the present system is directed to a data storage system using a number of drive enclosures, with each enclosure containing a plurality of storage devices (including, for example, NVMe devices, and/or SAS devices), which are shared by at least two storage controllers (storage controller nodes), where the subject system operation is supported by the Infinite Memory Engine (IME) software modified with a multi-level selection mechanism (which may be executed on a "write" requesting client), which selects a healthy drive enclosure from the available drive enclosures, and subsequently, selects a healthy storage controller node within the selected drive enclosure for servicing the "write" request, i.e., the data routing and storage.

Further, the present invention is directed to a data storage system supporting a distributed data protection routine which is capable of object replication permitting the placement of at least two copies of the object across a set of drive enclosures by selecting at least two highest ranked members of the set of drive enclosures, and attempting to mirror the object on the selected drive enclosures. A similar replication scheme can be used for mirroring data across at least two storage controller nodes within the same drive enclosure.

The subject invention is further directed to a high performance data storage system supporting data redundancy schemes (that rely on parity or erasure codes), in which clients accumulate parity and log-structured data objects (such as RAID stripes) in a two-dimensional matrix (where drive enclosures constitute one dimension of the matrix, and the storage controllers in each storage enclosure constitute another dimension), and where bulk data in each RAID stripe is added into the matrix, and parity is generated using the matrix. The matrix is used in the subject system to ensure that there is no chance of collision between bulk data units and data protection (parity) fragments of the RAID stripe "written" into data storage devices.

The present invention is also directed to a data storage system capable of scaling up to a rack shared storage configuration with hundreds of compute nodes sharing hundreds of network attached storage devices.

BACKGROUND OF THE INVENTION

Storage information in a high performance computing environment presents certain challenges and requires data storage architecture and data migration procedures permitting a high level of efficiency and fault tolerance for the data migrating between the high performance computers and long-term (or permanent) data storage.

Data storage architectures handling high performance computations have been developed, including those described in U.S. Patent Application Publication No. 2014/0108723, filed as Ser. No. 14/056,265, directed to "Reducing Metadata in a Write-Anywhere Storage Sub-System"; U.S. Patent Application Publication #2014/0108473, filed as Ser. No. 14/050,156, directed to "Maintaining Order and Fault-Tolerance in a Distributed Hash Table System"; U.S. Patent Application Publication #2014/0108863, filed a Ser. No. 14/035,913, describing "Handling Failed Transaction Peers in a Distributed Hash Table"; U.S. Patent Application Publication #2014/0108707, filed as Ser. No. 14/028,292, related to "Data Storage Architecture and System for High Performance Computing"; and patent application Ser. No. 14/045,170, directed to "Method and System for Data Transfer between Compute Clusters and File System", and others.

All these architectures use distributed data storage and a specific addressing system capable of pointing a request (when a file access is requested) to a particular location (or locations) within a group of distributed memories.

Multiple storage controllers are typically included in data storage architectures to control operation of the data storage devices. The storage controllers usually are logically interconnected to share the information on data items residency.

In order to prevent data loss as to data corruption in the event of a storage device failure, the data storage systems require intercommunication between the storage controllers configured with redundant partners and continuous arbitration for "write" I/O operations to prevent the storage controllers from placing multiple shards (fragments) of the same RAID stripe on the same storage device. The intercommunication between storage controllers disadvantageously adds latency and overhead to any operation which would modify the data in the storage devices.

In a data storage system including N storage controllers, due to the permanent arbitration on the data placement between the storage controller nodes, the number of messages passed for a single request/acknowledge operation may be as large as 2N. The intercommunication between the storage controllers thus undesirably prevents from scaling up beyond two storage controllers.

It would be highly desirable to reduce (or eliminate) the intercommunication and continuous arbitration for "write" I/O operations between the storage controllers, while assuring a high level of data integrity prevention from data corruption and data loss, as well as providing the I/O operations (requiring modifications to data) to have low latency and to require reduced overhead.

SUMMARY OF THE INVENTION

It is therefore an object of the subject invention to provide a data storage architecture and a data migration process assuring a high level of data integrity protection which does not require the intercommunication and continuous arbitration between storage controllers for "write" I/O operations.

It is another object of the subject invention to provide a data storage architecture which uses a distributed storage sub-system, where the storage devices are divided into separate storage sections (pools), and where each storage controller is assigned to a respective storage pool for exclusive data "writes", thus assuring that data serviced by different storage controllers are written in different storage devices for collision prevention in data placement, and protecting from data corruption/loss if a data storage device fails.

It is a further object of the present invention to provide a data storage system supporting a data migration protocol, which sends each shard (or fragment) of a RAID stripe to different storage controllers for being written to separate storage devices, thus assuring data integrity and ensuring a reliable rebuild of a missing data in the event of a storage device failure.

In addition, it is an object of the present invention to provide a data storage system using a set of drive enclosures with each serviced by a number of storage controllers, and supporting a data migration protocol which is implemented with a multi-level (at least two-step) storage entity selection routine configured for selection of at least one healthy drive enclosure, and subsequently, for selection of a healthy storage pool within the drive enclosure for holding (writing) data. During the process, the storage entity selection routine requires no explicit communication between the clients and the distributed storage entities (drive enclosures and storage controllers). Clients can arrive at the selection result for a specific data object independently without coordination or communication with the storage entities, thus providing a low latency and reduced overhead I/O process.

It is also an object of the present invention to provide a data storage system where a two-dimensional selection key is generated for identification of distributed storage entities (i.e., storage enclosures for holding a block of data and storage controllers) that manages a data object, and which provides a uniformly random distribution of data objects across the entire storage tier.

It is another object of the present invention to provide a data storage system which supports distributed data protection schemes (1) which are capable of handling changes in the healthy sets of storage enclosures and storage controllers, (2) can route and uniformly distribute data across arbitrary sized sets of storage resources (pools), and (3) where object replication can be efficiently achieved by selecting more than one healthy storage entity from the list of two-dimensional selection keys, and mirroring the object to two (or more) enclosures and/or to two (or more) storage controllers within the same drive enclosure.

In one aspect, the present invention is directed to a protocol for data migration between compute nodes and data storage devices which is supported by a data storage system built with a plurality of storage controllers arranged in at least a first set of storage controllers (constituting, for example, at least a first drive enclosure), and at least a second set of storage controllers (constituting, for example, at least a second drive enclosure).

In each of the first and second drive enclosures, the data storage devices are dynamically separated into a plurality of isolated storage pools, each storage pool containing a respective portion of the data storage devices available in the system.

Each of the storage controllers is dynamically assigned a respective identification code. In addition, each of the storage controllers is appointed to a respective storage pool of the data storage devices for exclusive "write" I/O operations.

Upon generating at least one data set (for example, a parity stripe) which includes a plurality of data fragments (shards) and at least one parity fragment (shard), and assigning each parity stripe a Parity Group Identifier (PGID). A compute node selects a storage controller for servicing a "write" request for a respective one of the data and parity fragments (shards) of the parity group. The selected storage controller node determines a respective storage pool assigned thereto, and writes the respective fragment of the parity stripe to the storage pool it is assigned to exclusively write.

In order to select the storage controller for servicing the "write" request, the compute nodes are provided with a selection sub-system which is configured for performing a multi-step selection routine. A first phase of the multi-step selection routine is configured for selecting a healthy drive enclosure, and a second phase of the multi-step selection routine (which follows the first phase) is configured for selecting a healthy storage controller within the selected healthy drive enclosure.

The subject protocol separates the data storage devices into the storage pools using an address scheme where an address range of the storage devices for exclusive use by each storage controller ranges from (M/N×C) to ((M/N×(C+1))−1), where M is the total number of addresses available on the data storage devices in the first and second drive enclosures, N is the number of storage controllers in each of the first and second drive enclosures, and C is the index of the specific storage controller.

In addition, each data storage device can be separated into at least two logical partitions of a predetermined size, and storage pools may be representative of collections of the logical partitions.

For determining the respective storage pool assigned to the selected storage controller node, the selected storage controller node computes the modulus of the sum of the PGID of the parity stripe, and the identification code of the storage controller, and thus determines the respective storage pool based on the modulus computations.

If at least one storage device containing the data (or parity) fragment fails, the system is capable of rebuilding a missing fragment of the parity stripe, using the rest of the data and parity fragment of the parity group written in different storage pools, and thus, in different storage data devices. The rebuilt fragment is subsequently placed on a healthy data storage device preferably in the same storage pool.

If a selected storage controller fails, another storage controller in the same drive enclosure assumes the duties of the failed storage controller. For this case scenario, the subject routine routes the fragment to be serviced on behalf of the failed storage controller, and selects the respective pool using the identification code of the failed storage controller.

The subject protocol is capable of operating in a data storage environment including more than two drive enclosures. In this storage configuration (in the first phase of the multi-level selection routine), a Data Key (DK) is assigned to a data object generated by at least one compute node, and an Enclosure Selection Key ERK=$\{DK, E_i\}$ is built for each drive enclosure.

Subsequently, a hash value for the Enclosure Selection Key of each drive enclosure is computed. A list of the hash values of the plurality of drive enclosures is formed and sorted (for example, in a descending order), and from the sorted list, a healthy drive enclosure having the highest hash value in the sorted list is selected.

Subsequently to the healthy drive enclosure selection, the second phase of the selection routing is performed by:

constructing a Controller Selection Key CRK=$\{DK, CI_i\}$, using the Data Key (DK) and the identification code (CI) for the Storage Controller, computing a hash value for each potential storage controller in the selected drive enclosure, forming and sorting a list of the hash values for the potential storage controllers in the selected drive enclosure, and selecting therefrom a healthy storage controller having the highest hash value in the sorted list.

Upon completion of the second phase of the subject multi-level selection routine, a two-dimensional selection key is generated which identifies the target drive enclosure for the data object, as well as the storage controller which services the "write" request for the data object by routing it to the respective storage pool.

The subject routine provides a uniform random distribution of data objects generated by the compute node across a plurality of drive enclosures and across the set of storage controllers in each of the drive enclosures.

The subject routine is configured with capability of performing an object replication by selecting at least two healthy highest ranked drive enclosures from the sorted list of the drive enclosures, and placing the data object on the selected drive enclosures.

The object replication routine may also be performed by selecting at least two healthy highest ranked storage controllers from the sorted list of storage controllers within the same healthy drive enclosure, and routing the data object to the selected storage controllers.

The subject protocol may be enhanced by segmenting data storage devices in the drive enclosures into logical partitions, and building each storage pool from a set of logical storage partitions formed on physical data storage devices. Each logical partition may be formed by splitting the LBA (Logical Block Address) space of each data storage device into a predetermined number of the logical partitions.

When a drive enclosure includes at least a first storage controller and a second storage controller, and upon receipt, at the first storage controller, a request to access data in a storage pool assigned to the second storage controller, the subject protocol converts, by the first storage controller, an object identifier into a corresponding LBA of the storage pool assigned to the second storage controller.

The subject protocol is augmented with capabilities of identifying the failure of the target (selected) storage controller, selecting a replacement healthy storage controller residing in the same drive enclosure with the target storage controller, assigning the replacement storage controller for the storage pool assigned previously to the target storage controller, and servicing the "write" request to the storage pool of the failed storage controller by the replacement storage controller.

In another aspect, the present invention constitutes a data storage system which is built with a plurality of drive enclosures, each containing a number of storage controllers and a plurality of data storage devices. A plurality of compute nodes are operatively coupled to the drive enclosures for "write" and/or "read" I/O operations.

In each drive enclosure, data storage devices are separated into a plurality of isolated storage pools, with each storage pool containing a respective portion of the data storage devices contained in the drive enclosure. In each drive enclosure, each storage controller is assigned a respective identification code and is appointed to a respective storage pool of the data storage devices for exclusive "writes" and data modification. The storage controllers have permission to "read" data from any storage pool irrespective of storage controller-storage pool affiliation.

The compute nodes are configured with capability of generating parity stripes (each built with a plurality of data fragments and at least one parity fragment). Each parity stripe is assigned a Parity Group Identifier (PGID).

The compute nodes are further configured with capability of performing a multi-step selection for selecting a healthy drive enclosure and a healthy storage controller in the selected drive enclosure to route (by the selected storage controller) the data segment to the storage pool assigned exclusively to the selected storage controller's "writes" and data modifications.

Upon receiving, at the selected storage controller node, a "write" request from the compute node (for a respective one of the data and parity fragments of the parity group), the selected storage controller determines the storage pool assigned thereto, and writes the respective fragment of the parity stripe to the respective storage pool.

Each storage device may be separated into at least two logical partitions of a predetermined size, and each storage pool may be represented by the LBAs of the logical partitions.

The present system is configured with the capability of rebuilding a missing fragment of the parity stripe (in case of the failure of the data storage device holding the fragment) using the rest of the data and parity fragments of the parity group written in different data storage devices within the same drive enclosure, or across the different drive enclosures in the storage tier of the subject system, and placing the rebuilt fragment on another healthy data storage device preferably in the same storage pool.

If at least one storage controller fails, the subject system is provided with the capabilities of assigning the duties of the failed storage controller to a replacement storage controller preferably in the same drive enclosure, and writing, by the replacement storage controller the respective fragment of the parity group on behalf of the failed storage controller into the storage pool assigned to the failed storage controller using the identification code of the failed storage controller.

The subject system may be organized with a plurality of the drive enclosures in the data storage tier. For this architecture, the subject selection sub-system is configured for performing the multi-step selection routine by:

in the first mode of the multi-level selection routine, the selection sub-system assigns a Data Key (DK) to a data object generated by the compute node, builds an Enclosure Selection Key ERK={DK, $E_i$} for each drive enclosure for the plurality thereof, computes a hash value for the Enclosure Selection Key of each drive enclosure, forms and sorts (for example, in a descending order) a list of the hash values of the plurality of drive enclosures, and selects from the sorted list, a healthy drive enclosure having the highest hash value in the sorted list.

In the second mode of operation, the Selection Sub-System constructs a Controller Selection Key CRK={DK, $CI_i$} using the Data Key (DK) and the Storage Controller ID (CI), computes a hash value for each storage controller in the selected drive enclosure, forms and sorts a list of the hash values for the storage controllers in the selected drive enclosure, and selects therefrom a healthy storage controller having the highest hash value in the sorted list.

The subject selection sub-system is configured with the capabilities to generate a two-dimensional selection key identifying (for the data object in question), the selected drive enclosure and the storage controller managing the data object routing to the assigned storage pool.

The subject system provides a uniform random distribution of data objects generated by the compute nodes across the plurality of drive enclosures and across the storage controllers in each of the drive enclosures.

The system is further configured to perform an object replication by selecting, at least two healthy highest ranked drive enclosures (for the data object) from the sorted list of the drive enclosures, and placing the data object on both (or more) drive enclosures.

The subject system is also configured to replicate objects by selecting at least two healthy highest ranked storage controllers from the sorted list of storage controllers in the selected drive enclosure, and placing the data object across the selected two (or more) storage controllers.

Preferably, in each drive enclosure, the data storage devices are segmented into the storage pools built from a set of logical storage partitions formed on physical data storage devices. Each logical partition may be formed by splitting an LBA (Logical Block Address) space of a corresponding data storage device into a predetermined number of the logical partitions.

The subject system is further enhanced with the capabilities of, upon receipt of a "write" request to access data in a storage pool assigned to a second storage controller, converting, by a first storage controller, the object identifier into a corresponding LBA of the storage pool of the second storage controller.

The subject system is further capable of:

upon determining the failure of a target storage controller, selecting, by the selection sub-system (using the sorted list of the storage controllers), a replacement healthy storage controller residing in the same drive enclosure with the failed target storage controller, assigning the storage controller for the storage pool previously assigned to the failed storage controller, and executing the "write" request by the replacement storage controller to the storage pool assigned to the failed storage controller.

These objects and advantages of the present invention will become more apparent when considered in view of further detailed description accompanying the Patent Drawings.

DETAILED DESCRIPTION OF THE PREFERRED EMBODIMENT

Figure 1A:
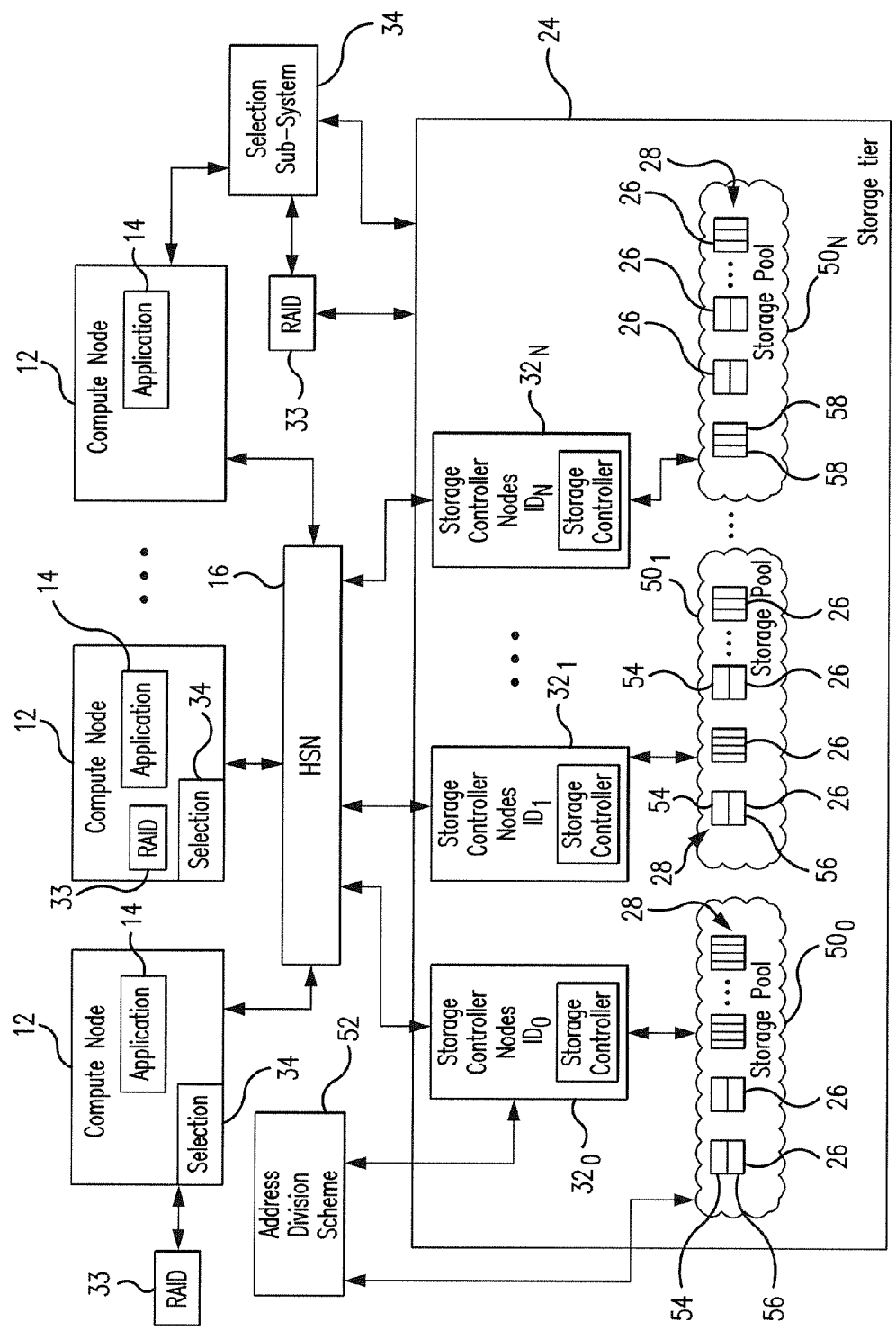
FIG. 1A is a simplified schematic representation of the subject protocol for data migration between data generation entities and Storage Entities.
Figure 1B:
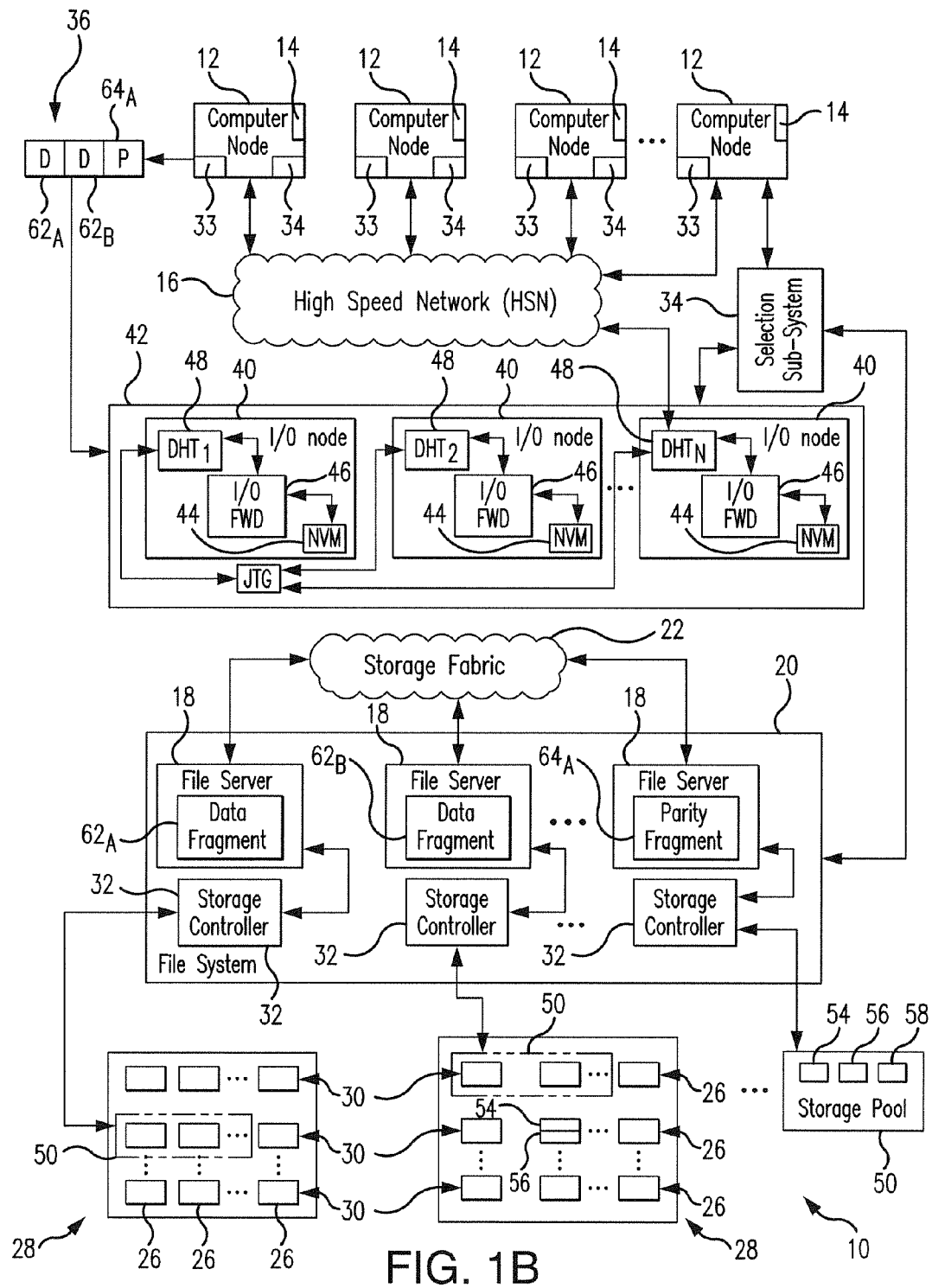
FIG. 1B is a schematic representation of one of alternative embodiments of the subject system.

Referring to FIGS. 1A-1B, the subject data migration and data storage system 10 includes a number of compute nodes 12. The compute nodes may be arranged in computing groups (or compute clusters) to perform complex computations of various types. The operation of the compute nodes depends on an application 14 running on the compute node.

The compute nodes may function as servers, supercomputing clusters, etc., and have the capacity to "write" by outputting data to, as well as "read" data from an external memory, or any other storage device. In the present description, the above presented devices may also be intermittently referenced further as data generating entities, or computing architectures, as well as clients, client nodes, and application hosts.

The compute nodes (or data generating entities) 12 are operatively inter-connected through a High Speed Network (HSN) 16 with File Servers 18. The High Speed Network (HSN) 16 functions as a high speed switch, and may be based on numerous network transport protocols, including, but not limited to, InfiniBand (IB), Fibre Channel (FC), PCIe, Gigabit Ethernet (GigE), Omni-Path, etc.

The File Servers 18 constitute a portion of the Backing File System (BFS) 20, and are configured to manage data migration from and to the compute nodes 12. The File Servers 18 may communicate through a Storage Fabric 22. The ratio of the compute nodes 12 to the File Servers 18 may in some cases be greater than 1,000.

During the Input/Output (I/O) cycle of a compute node's operation, the data may be transferred from the compute node's cache to the File Servers 18 which may place data in the Backing File System 20 for subsequent retrieval. Additionally, during the I/O cycle of the compute node's operation, the client may request "read" data.

Data retrieved from compute nodes 12, and/or File Servers 18, are intended to be written into the File System 20, and stored in a primary storage sub-system 24 which typically includes data storage devices 26 which may be in the form of Non-Volatile Memories (NVMs), such as, NVMe, for example, Hard Disk Drives (HDDs), Solid-State Drives (SSDs), flash memory devices, SAS devices, magnetic tapes, and other types of storage media. For the sake of simplicity, and only as an example, the storage devices 26 will be referred to as NVM, as well as disk drives, although any other storage media may be considered for the primary storage sub-system 24.

The data storage devices 26 may be arranged according to any of a variety of techniques, and in any format, for example, as storage disk arrays 28. For example, the storage disk arrays 28 may be arranged in the RAID (Redundant Array of Independent Drives) format. The RAID storage system is a multi-dimensional array 28 of disk drives (or flash memory devices) 26 distributed in READ/WRITE tier groups 30 for storing data D and parity values P corresponding to data stored in the array 28. Each tier group 30 in the array of data storage devices 26 constitutes a multiplicity of data storage channels.

The operation of computer clusters, as well as single computers, i.e., the hosts 12, requires data writing to and/or reading from the data storage devices 26. The process of data transfer is carried out during the I/O cycle of the computers 12. The size of the computer clusters and the aggregate I/O bandwidth that are to be supported may require thousands of data storage devices 26 for servicing the computing architecture.

The File System 20 services the I/O request through storage controller Node(s) 32.

At least one storage controller 32 controls the operation of the data storage devices 26 in their respective arrays 28. In the present invention, the data storage devices 26 are accessed in accordance with the subject multi-step (for example, two-phase) selection routine invoked by the subject Selection Sub-system 34 shown in FIGS. 1A-1B and 2A-2B, as well as FIGS. 3 and 4, and detailed in the following paragraphs. The subject protocol is performed in an efficient manner providing a low latency I/O performance with reduced overhead requirements in the subject system 10.

Data storage devices 26 may be provided with the capability of receiving data in the most efficient manner, so that the system 10 avoids the need for an excessive number of data storage devices for storing the parity group data. For example, the storage devices which do not participate in data transfer, may stay deactivated, as controlled by the storage controller (also referred to herein as a storage controller node) 32 for the period they are not accessed. This avoids excessive power consumption of the storage disk arrays.

Each compute node 12 may be equipped with (or operatively coupled to) a software unit 33 which controls the operation of the compute node for the intended purposes, and, as an example, is configured with RAID computation capabilities, for example, for construction of a Parity Stripe 36, and RAID respective operations and functions.

A selection sub-system 34 may also reside with (or be operatively coupled to) the compute nodes 12 for the purposes of the efficient routing of the fragments (data fragments and parity fragments) of the RAID stripe 36 to the storage sub-system 24 provided by the subject protocol, as will be detailed in the following paragraphs.

The RAID software unit 33 also functions to assign a unique ID or PGID (Parity Group Identifier) for each generated Parity Group 36. The PGID, as well as metadata and other related information 38 may also be included in the I/O request 39 with the Parity Group 36.

The subject protocol is applicable in many data migration and storage architectures. For example, in one of alternative embodiments shown in FIG. 1B, applications 14 running on compute nodes 12 may facilitate the migration of the Parity Group 36 to the storage sub-system 24 through a tier 42 instead of writing the Parity Group 36 directly into the File System 20. In the exemplary architecture shown in FIG. 1B, the input performance of the NVM unit 44 embedded in the I/O Nodes 40 is at least one order of magnitude faster than the input activity of HDD-based Parallel File System 20. Thus, the increase in I/O speed permits the applications 14 to complete their calculating activity in an expedited fashion.

The I/O nodes (also referred to herein as I/O servers) 40 are connected between the High Speed Network 16 and the File Servers 18. Each I/O node 40 is a server which may act as a temporary and fast store for data.

The I/O nodes 40 constitute the intermediate tier 42 which may serve as an interface and render communication between the compute nodes 12, High Speed Network 16, and the File Servers 18 using a number of data transfer protocols (for example IB, FC, Omni-path, GigE, PCIe, etc.), as needed by the system. The I/O nodes 40 are adapted for interfacing with the File Servers 18, as well as with the File System 20 in its entirety.

By utilizing the intermediate tier 42 of storage hardware which may be based on Non-Volatile Memory (NVM) technology operatively coupled between the compute nodes 12 and the File System 20, the capability of storing the data in the subject system may be attained in an expedited and efficient manner. The tier 42, also referred to herein as an intermediate storage sub-system, includes a number of NVM units 44. Each NVM unit 44 is operatively coupled to an I/O Forwarding Software 46 in the I/O nodes 40.

Each Parity Group 36 resident in the tier 42 is moved into the Parallel File System 20 at some point to make room for a next Parity Group to transfer to the tier 42 from a compute node.

Distributed Hash Table (DHT) sub-system 48 is included in the subject system. The DHT sub-system 48 is a class of a decentralized distributed system that provides a lookup service similar to a hash table in which "key, value pairs" are stored in a DHT server. Any participating node can efficiently retrieve the value associated with a given key. Responsibility for maintaining the mapping from keys to values is distributed among the nodes, in such a way that any change in the set of participants causes a minimal amount of disruption. This allows the DHT to be scaled to extremely large numbers of nodes and to handle continual node arrivals, departures, and failures.

In the exemplary embodiment of the subject system, shown in FIG. 1B, each I/O node 40 has included therein a portion of a Distributed Hash Table (DHT) server 48. $DHT_1$, $DHT_2$, . . . , $DHT_N$ are the portions of the DHT server maintained by the I/O nodes 40 of the tier 42.

The distributed DHT server may also reside, as an alternative, with the File Servers 18, File Nodes 20, Storage Controllers Nodes 32, or in any other configuration supporting the DHT distributed structure.

A foundation of the DHT represents an abstract keyspace. A keyspace partitioning scheme splits ownership of the keyspace among the participating nodes. An overlay network then connects the nodes, allowing them to find the owner of any given key in the keyspace. Consistent hashing provides that a removal or an addition of one node changes only the set of keys owned by the nodes with adjacent IDs, and leaves all other nodes unaffected.

The DHT 48 in the subject system 10 is primarily used to maintain location information for stored data items, also referred to herein as Unstructured Layout Metadata (ULM) for data fragments and parity fragments of the parity groups 36 written by the compute nodes 12 in the intermediate tier 42 and subsequently in the storage sub-system 24, or directly in the storage tier 24.

The ULM refers to the layout information of a Parallel File System whose contents may be arbitrarily distributed among the storage elements. The DHT 48 may also store Parity Group Information (PGI), Parity Group Identification (PGID), data item (or file) attributes, file replay status, and other information about the stored data item.

The present system 10 permits data movement from the Compute Nodes 12 to the File System 20, and ultimately, to the storage tier 24 in a highly efficient manner providing data integrity and preventing data corruption, while servicing "WRITE" requests which are attained, inter alia, through the use of the subject protocol. Similarly, when servicing "READ" requests, data migrates from the File System 20 into the requesting compute node(s) 12 in an efficient and corruption-free manner.

Figure 2A:
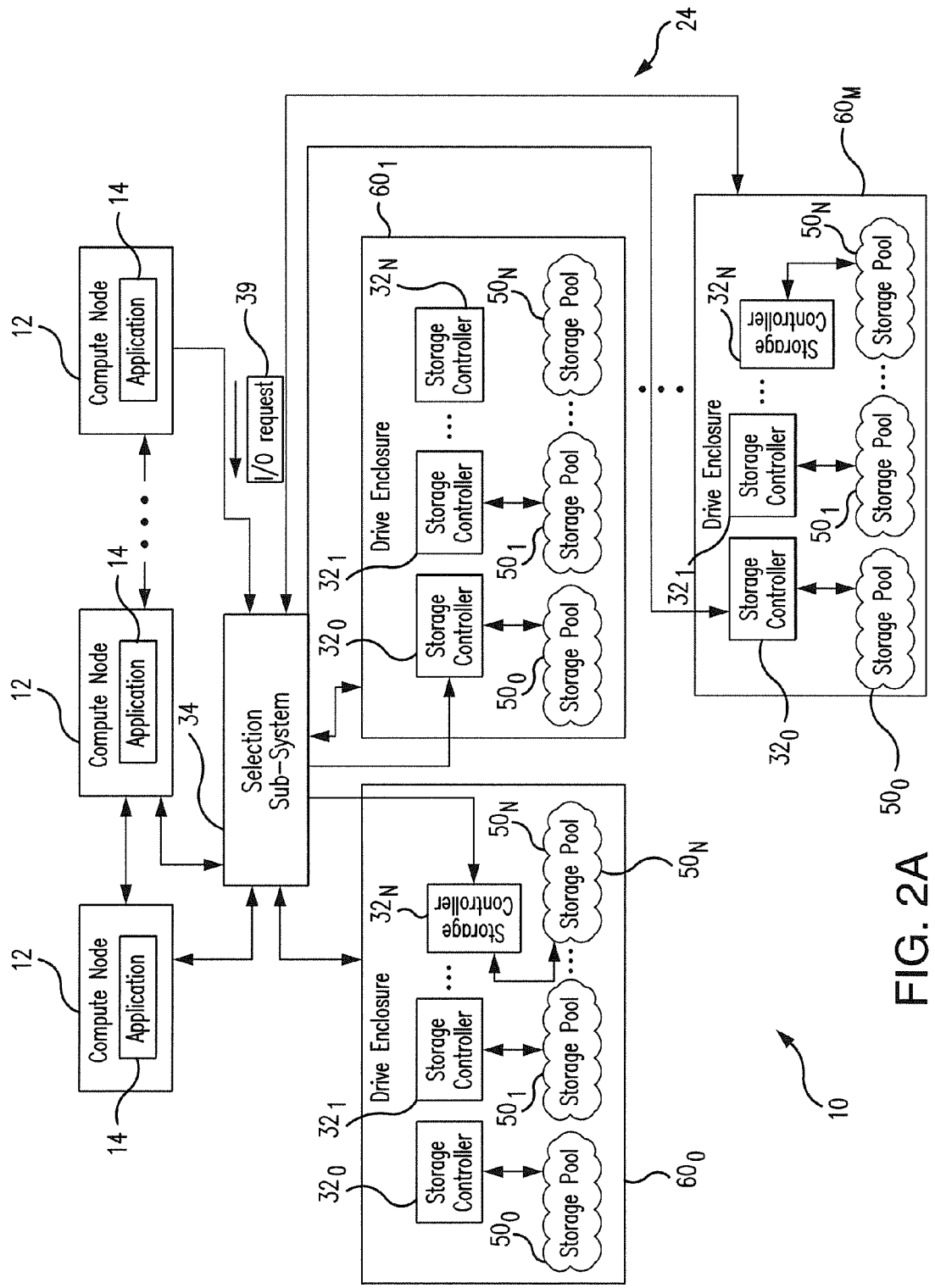
FIG. 2A is a schematic representation of the subject data storage system built with a number of drive enclosures.
Figure 2B:
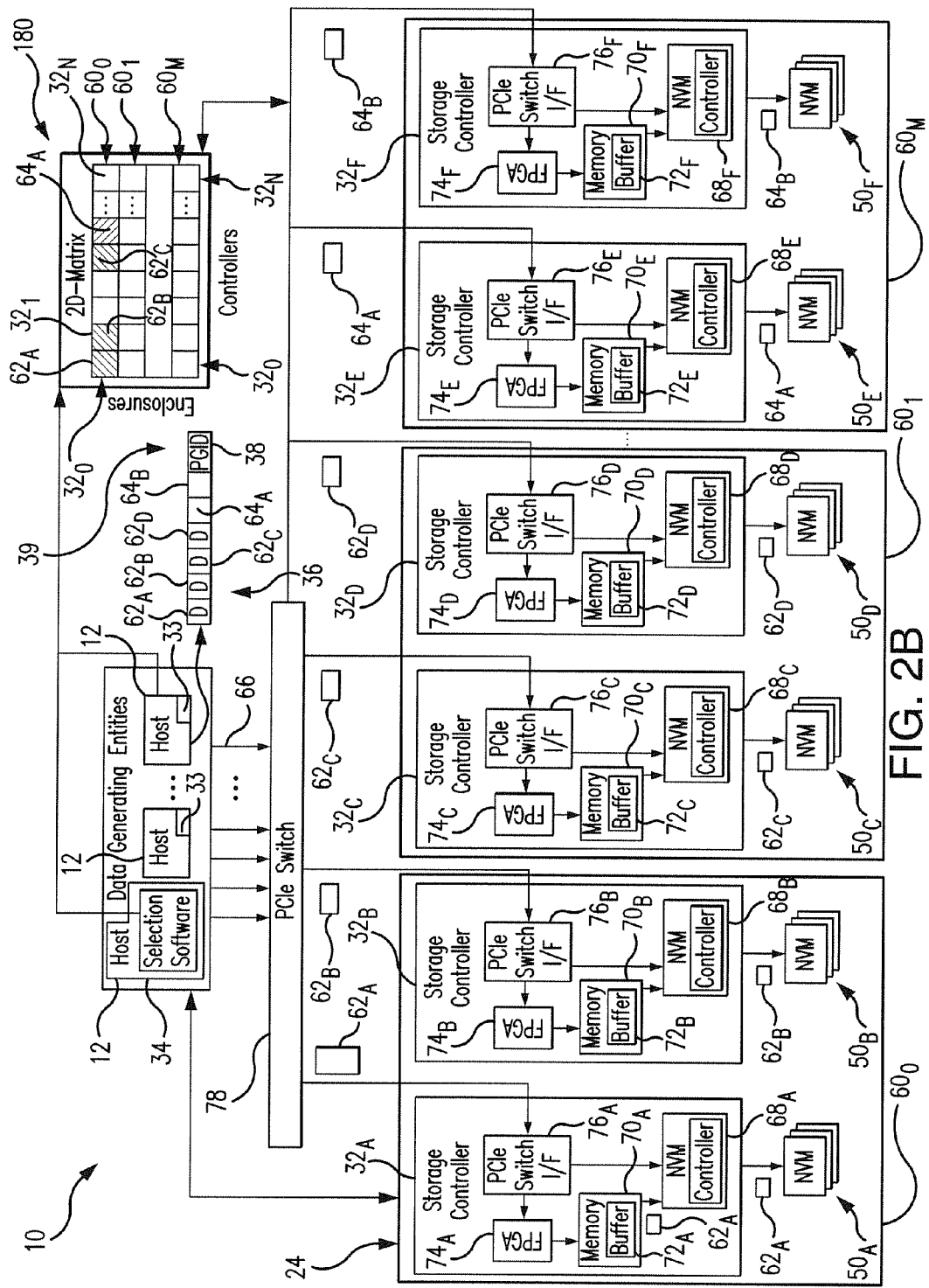
FIG. 2B is a schematic representation of one of alternative embodiments of the subject system detailing the storage tier supporting the subject protocol for writing data fragments of a RAID stripe.

Alternatively, as shown in FIG. 2B, the Parity Group 36 can move to the Storage Controller Nodes 32 through the HSN, and particularly through the PCIe switch 78 without the intermediate tier 42.

As shown in FIG. 1A, for the storage controllers $32_0$, $32_1$, ..., $32_N$ in the storage sub-system 24, each storage controller (which also may be referred to herein as a storage controller node) is assigned a unique ID ranging from 0 to N, i.e., $ID_0$ for the storage controller $32_0$, $ID_1$ for the storage controller $32_1$, ..., and $ID_N$ for the storage controller $32_N$.

The data storage devices 26 employed in the system 10 are divided into the sections (also referred to herein as storage pools) $50_0$, $50_1$, ..., $50_N$, to correspond to the number of storage controllers used in the system. Each storage controller (node) 32 is assigned one storage pool from a plurality thereof, i.e., the storage pool $50_0$ is assigned for the storage controller $32_0$, the storage pool $50_1$ is assigned for the storage controller $32_1$, etc.

Each storage controller 32 has the right to "write" into the respective storage pool based on the storage controller node ID. Each storage controller 32 has exclusive permission to "write" data (or modify data) only in the storage pool "it owns". The storage controllers 32, though, can read data from the sections (storage pools) they are assigned to, as well as from other storage pools, as needed.

The data storage devices 26 can be divided into the storage pools $50_0$, $50_1$, ..., $50_N$ using an address scheme 52 (shown in FIG. 1A), where the address range for each storage controller $32_0$, $32_1$, ... $32_N$ ranges from (M/N×C) to ((M/N×(C+1))−1). In the address division scheme 52, M is the total number of addresses on the data storage devices in the storage sub-system 24 or any part thereof (for example, a drive enclosure detailed in further paragraphs), N is the number of storage controllers $32_0$, $32_1$, ... $32_N$ in the drive enclosure, and C is the index of a specific storage controller.

Each data storage device 26 may be divided into logical partitions 54, 56 by the system's operation system. In addition, each device 26 can be formatted to have multiple partitions 58, such as for example, NVMe name spaces.

Referring to FIGS. 2A-2B, the storage tier (or storage sub-system) 24 is represented as a set of drive enclosures $60_0$, $60_1$, ..., $60_M$, each including (in a simplified form) a number of storage controllers $32_0$, $32_1$, ... $32_N$, and data storage devices 26 separated into the storage pools $50_0$, $50_1$, ... $50_N$.

In an exemplary embodiment shown in FIG. 2B, the drive enclosures $60_0$, $60_1$, ..., $60_M$, may include the storage controllers $32_A$, $32_B$, $32_C$, $32_D$, $32_E$, and $32_F$ distributed across the drive enclosures $60_0$, $60_1$, ..., $60_M$, in any manner Each of the storage controllers ($32_A$, $32_B$, $32_C$, $32_D$, $32_E$, and $32_F$) is exclusively interconnected with a respective storage pools $50_A$, $50_B$, $50_C$, $50_D$, $50_E$ and $50_F$, respectively. It is to be understood that the arrangement illustrated in FIG. 2B is one of many alternative embodiments covered by the subject invention, and any number of the storage controllers and storage pools in the drive enclosures different from the exemplary arrangement shown in FIG. 2B may be used in the subject system 10.

During operation, a virtualized RAID unit engine 33 (which may reside with the compute nodes 12, or with any other tier, or at any portion of the subject system 10) applies RAID calculations to data ingress from a data generating entity 12 prior to "writing" the data into the data storage devices. As a part of the RAID calculations, parity values (for example, $64_A$, $64_B$) are calculated for the ingress data (for example, bulk data $62_A$, $62_B$, $62_C$, $62_D$). The RAID unit allocates space in the data storage devices 26 for the data D and the parity values, for example, P, Q, depending on the RAID scheme used in the subject process for the data protection.

For example, as shown in FIG. 2B, the data generating entities 12 form a Parity stripe 36 which includes data fragments 62 ($62_A$, $62_B$, $62_C$, $62_D$) and, for example, two parity fragments (64A and 64B). Each fragment of the parity stripe 36 (i.e., the data fragments 62 and the parity fragments 64) is sent to a different storage controller $32_A$, $32_B$, $32_C$, $32_D$, $32_E$ and $32_F$, under the control of the compute node 12, and particularly, the selection sub-system 34, in order to be placed on respective storage pools $50_A$, $50_B$, $50_C$, $50_D$, $50_E$ and $50_F$.

Each fragment of the parity stripe is assigned a unique ID, or PGID (Parity Group Identifier). When a storage controller 32 (or the corresponding file node 20) receives a "write" request from the compute node 12 for a respective shard (fragment) of the RAID stripe 36, index of the storage controller determines to which pool 50 of the storage devices 26, the fragment of the RAID stripe 36 can be written to. In this manner, the shards ($62_A$, $62_B$, $62_C$, $62_D$, and 64A, 64B) of the RAID stripe 36 are guaranteed to be written into different storage pools 50, and thus in different storage devices 26.

The subject routine eliminates the need for the storage controllers to arbitrate between themselves as to where the data should be placed to avoid collision (i.e., being placed on the same data storage device).

A plurality of data channels exist between the data generating entities 12 and the data storage devices 26 for data migrations therebetween. For example, the drive enclosures $60_0$, $60_1$, ..., $60_M$ containing the data storage controllers 32 ($32_A$, $32_B$, $32_C$, $32_D$, $32_E$, and $32_F$) service a data channel 66.

In each of the data channels used by a particular host 12 for data transfer, the host determines the distribution of data. Each host 12 is equipped with the selection sub-system 34 for performing the task, i.e., the selection software 34 permits the client 12 to appoint one of the drive enclosures 60, and one of the storage controllers within the appointed drive enclosures 60, to service the "write" request 39 (i.e., for the parity stripe 36 "writing"), or any data object I/O operation requested to be serviced by the compute node 12.

As shown in FIG. 2B, each storage controller 32 may include an NVM controller 68 ($68_A$, $68_B$, $68_C$, $68_D$, $68_E$, and $68_F$, respectively) operatively coupled to a corresponding NVM storage pool $50_A$, $50_B$, $50_C$, $50_D$, $50_E$, and $50_F$, respectively, a memory 70 ($70_A$, $70_B$, $70_C$, $70_D$, $70_E$, and $70_F$, respectively), a buffer 72 ($72_A$, $72_B$, $72_C$, $72_D$, $72_E$, and $72_F$, respectively) within the memory 70, and an FPGA unit 74 ($74_A$, $74_B$, $74_C$, $74_D$, $74_E$, and $74_F$, respectively). Each data storage controller node 32 ($32_A$, $32_B$, $32_C$, $32_D$, $32_E$, and $32_F$) may include a PCIe switch interface 76 ($76_A$, $76_B$, $76_C$, $76_D$, $76_E$, and $76_F$, respectively) through which each storage controller 32 can access data in an expedited manner.

The data storage controllers 32 ($32_A$, $32_B$, $32_C$, $32_D$, $32_E$, and $32_F$), being substantially of identical design are interchangeable, and can service any data object (either data or parity). The specific function of the parity and data storage controllers, as well as the number of data storage controllers 32 is adaptively defined as needed for servicing a specific "write" and/or "read" data request.

The memory unit 70 may be of any type, including, but not limited to, DDR (Double Data Rate), Static Random Access Memory (SRAM), Flash Memory, etc. For example, being adapted for the DDR memory, the storage controllers 32 may permit twice the data to be transferred without increasing the memory clock rate or increasing the bandwidth of the memory interface. When operating with the SRAM memory unit, the storage controller 32 may attain an improved SRAM bandwidth (due to the use of inverters for driving bit lines), higher speed of operation (due to the acceptance of all address bits at a time), and easily detectable small voltage swings (due to differential signaling permitted by the symmetric structure of the SRAMs). When operating with a flash memory 70, the storage controllers 32 may use less power and are significantly lower in cost than other types of memory.

As shown in FIG. 2B, the host 12 sends, through the high speed PCIe switch 78 (or any other high speed interconnect), a "write" data request 39, for example, in the form of the parity stripe 36 segmented into various data blocks $62_A$, $62_B$, $62_C$, and $62_D$, and, based on the RAID protection scheme chosen for the operation, the parity block(s), for example, $64_A$, $64_B$.

As the incoming data is striped, i.e., segmented logically in sequential data blocks, the sequential data blocks are sent to different physical storage devices, for example, storage devices 26 included in the different storage pools $50_A$, $50_B$, $50_C$, $50_D$, $50_E$, and $50_F$. The sequential data blocks may also be sent to different partitions 54, 56, 58 included in different pools. The size of the incoming data blocks ($62_A$, $62_B$, $62_C$, $62_D$, $64_A$, $64_B$) may differ from the one presented in FIG. 2B (which is given here as an example).

As shown in FIG. 2B, the storage controller $32_A$ which is coupled to the storage pool $50_A$ receives the data block $62_A$. The data storage controller $32_B$ coupled to the storage pool $50_B$ receives the fragment $62_B$ of the data. The data storage controller $32_C$ (coupled to the pool $50_C$) receives a data block $62_C$, while the data storage controller $32_D$ coupled to the storage pool $50_D$ receives the data block $62_D$. The data storage controller $32_E$ coupled to the storage pool $50_E$ receives the parity fragment (shard) $64_A$, and the data storage controller $32_F$ receives the parity fragment $64_B$ of the incoming "write" request (RAID stripe) 36.

In operation, each data fragment $62_A$-$62_D$ and the parity blocks $64_A$-$64_B$ in the parity stripe 36 flows from the host 12 to the PCIe switch 78. Upon receipt of the data block or parity block, the PCIe switch 78 may forward the data to the FPGA 74 to be stored in the memory 70 of the corresponding controller 32 (i.e., $32_A$, $32_B$, $32_C$, $32_D$, $32_E$, and $32_F$). The PCIe switch 78 can mirror each data block and parity block to the FPGA unit 74 in the respective parity storage controller 32 to be saved in the memory 70. The NVM controller 68 of the data storage controller 32 corresponding to the NVM memory pool 50 reads the data from the memory 70 and writes it directly to the pool 50 assigned exclusively to the data storage controller 32.

In addition to storage entities, such as data storage controllers and pools of data storage devices, each drive enclosure 60 may include power supply(s), fan(s), temperature sensor(s), monitoring logic, enclosure CPU, and other devices necessary to support and provide the drive enclosure 60 with the capability for supporting I/O operations between the client/compute nodes 12 and target storage devices 26 through the computing cloud.

The subject protocol is applicable in any architecture adapted for data migration, data modification, and data storage.

As examples only, but not to limit the scope of the subject system and method, illustrated in FIGS. 2A and 2B, the subject system may also be targeted, as an example, at solving data storage sharing in the DDN (Data Direct Network) 14K platform with the IME software. In this implementation, the enclosure 60 may have 48 NVMe or 72 SAS devices shared by two controller canisters running the IME software.

The Infinite Memory Engine (IME) concept aims to integrate Non-Volatile Memory (NVM) into the parallel storage stratum. The IME combines non-deterministic write methods with inferential data location techniques based on address domains. By using these techniques in a cooperative manner, a data storage system support is provided for extremely fast data ingestion into a set of I/O nodes within the intermediate tier 42 (shown in FIG. 1B) while supporting a consistent "read" view of the entire underlying file system.

As a technology, the IME exploits a large array of NVM devices which are connected via a low-latency infrastructure for enabling fast ingest of data to NVM arrays by allowing the data to be stored in the NVM arrays in an unstructured manner, and allowing the system to provide an orderly, germane egress of the data from the distributed NVM arrays to a "permanent" (or long-term) storage, where the data resides in a highly structured format.

The present system and method scales up the rack shared storage configuration with hundreds of compute nodes 12 sharing hundreds of network attached storage devices.

Referring to FIGS. 1A-1B, 2A-2B, 3 and 4, the present system supports a multi-step, for example, a two-step selection process to be executed at the selection sub-system 34 which may reside with the client 12 or be operatively coupled thereto and to the storage tier (enclosures 60 and storage controllers 32). The selection sub-system 34 permits multiple storage controllers 32 to share multiple storage devices 26 without continuous arbitration for "writes". The subject system prevents the storage controllers 32 from placing multiple shards of the same RAID stripe 36 on the same data storage device, thus preventing data loss if a data storage device has failed.

The subject routine supported by the system 10 practically eliminates intercommunication between the storage controllers 32, thus dramatically reducing operation latency and overhead to any operation that would modify the data in the storage devices. Given a system with N number of storage controllers 32, the number of messages passed for a single request/acknowledge operation would be 2N. The present system successfully overcomes such a migration load associated with storage controllers intercommunication for data "writes" arbitration, thus it can be scaled up well beyond 2 storage controllers.

Selection Between Drive Enclosures and Storage Controllers

The subject selection sub-system 35 requires a two-step selection process to be executed, as an example, on the client 12. This approach differs from the typical IME selection protocol that routes data using a flat namespace of IME peers, where more than one peer can exist within a single drive enclosure.

Figure 3:
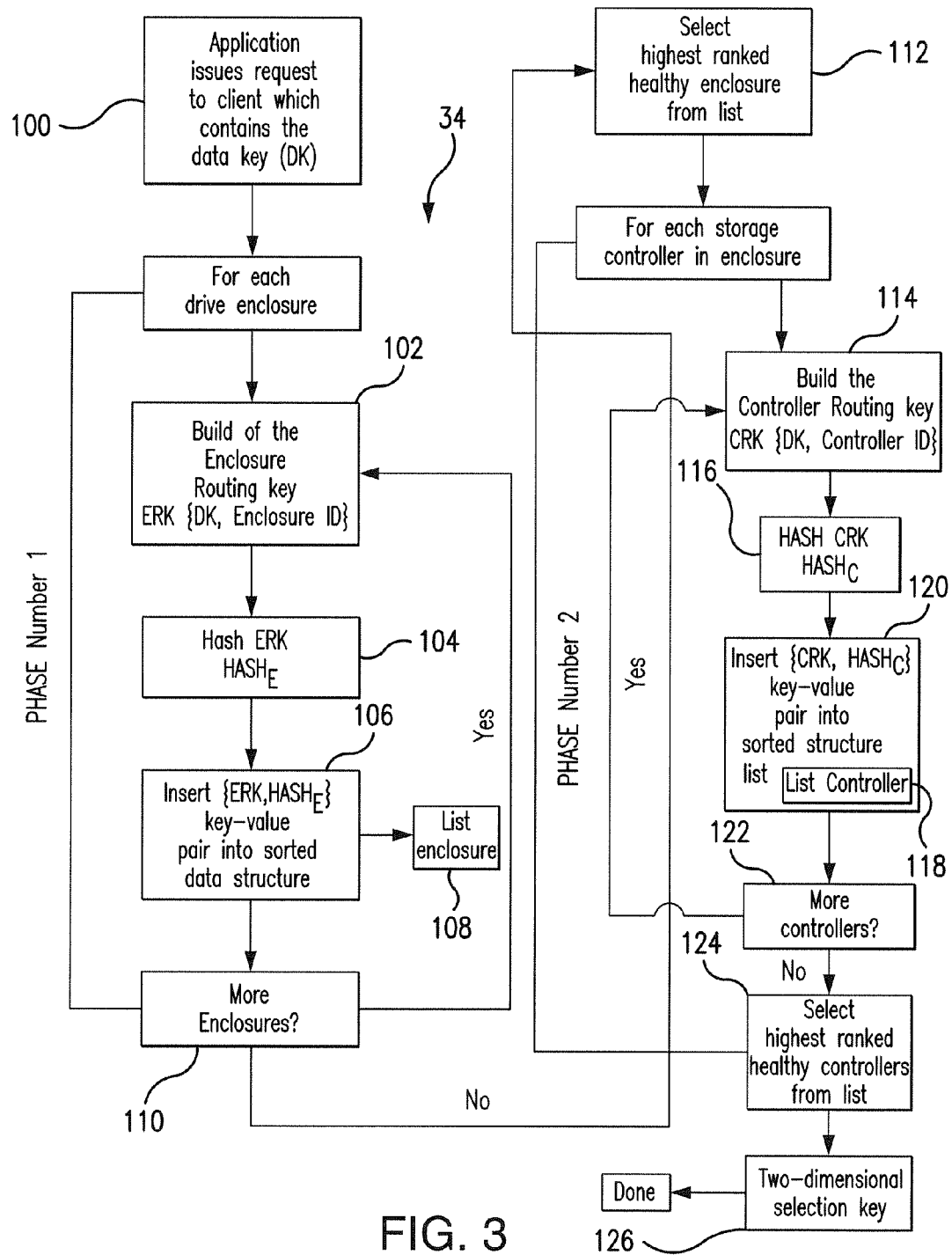
FIG. 3 is a flow-chart diagram of the subject two-level selection protocol for a single object.
Figure 4:
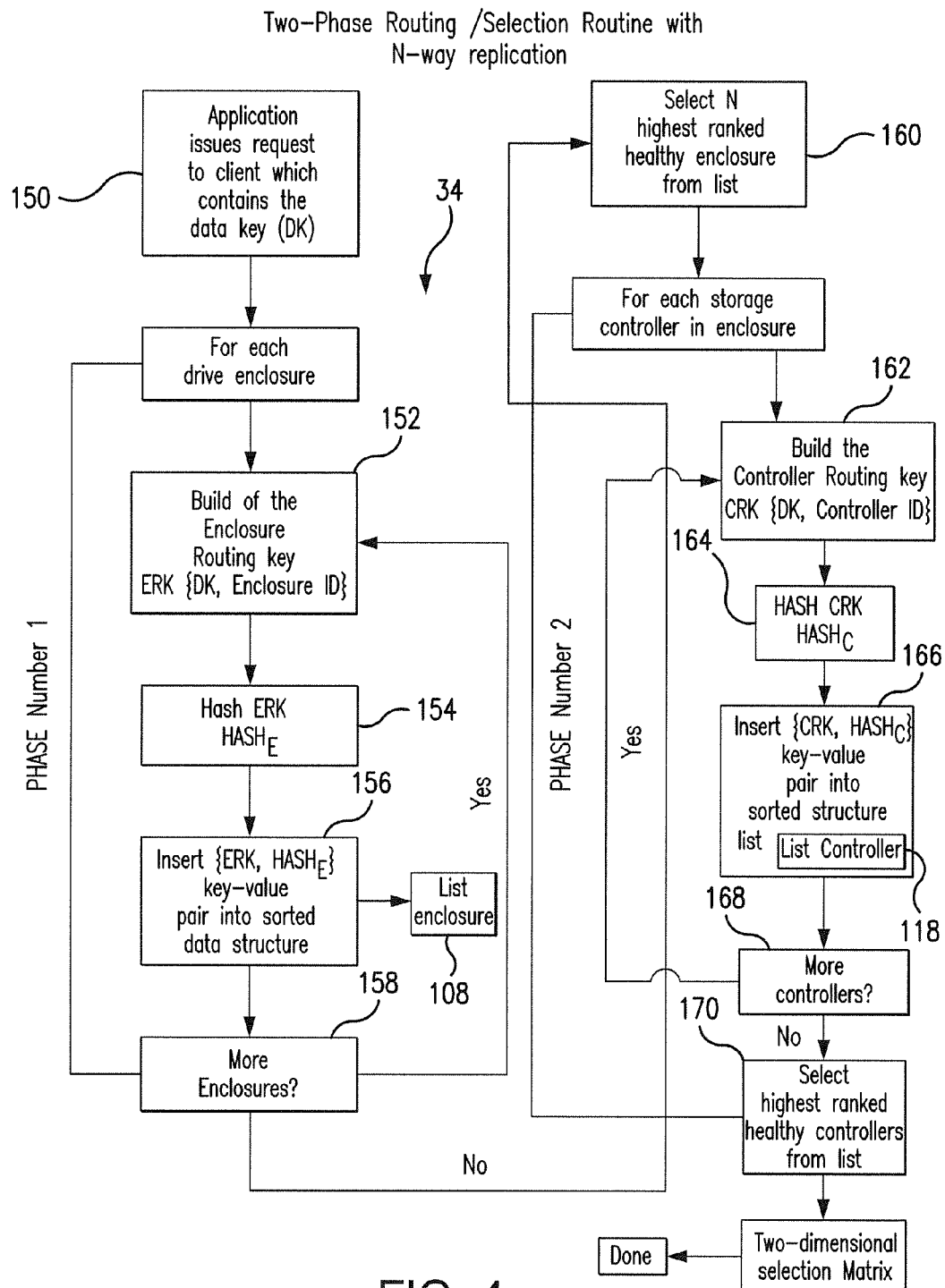
FIG. 4 is a flow-chart representative of the subject two-level selection protocol for an N-way replicated object.

The subject multi-level selection routine includes two phases. As shown in FIGS. 3 and 4, in the first phase, the client selects a drive enclosure 60. In the first step, clients route data fragments on a per-enclosure (or storage-chassis) basis, and select the appropriate drive enclosure that will hold the data. In the second selection phase, the client selects a storage controller (and a respective storage pool) within an enclosure. The second step routes data within the enclosure to the correct storage pool.

As shown in FIG. 3, in the first phase (drive enclosure selection) of the selection routine 34, in Step 100, an application running on a compute node, generates a "write" request which contains the "data key" (DK).

Subsequently, for each drive enclosure, given a Data Key DK for a specific object and a set of drive enclosures, the target enclosure is selected by building, in Step 102, an Enclosure Selection Key ERK={DK, E_i} for each enclosure in the set.

Subsequently, in Step 104, the selection sub-system computes a hash value for the Enclosure selection (or Routing) key (ERK), and then in Step 106 the hash value is added to a sorted list 108 of potential enclosure targets.

Once all possible hashes are computed for all potential drive enclosures, and the list 108 of hash values is sorted (for example, in a descending order), the list 108 is searched until it reaches the highest ranked drive enclosure that is defined as healthy in the storage system membership list. The subject routine thus executes the health/availability of enclosures selection process, which differs from the object mapping computation and selection process. In the subject selection process, the mapping is stable as enclosures enter or leave the storage system.

In the subsequent Step 110, the selection process makes a decision on whether more target potential enclosures are available. If more enclosures are to be checked, the selection process loops back to Step 102. If, however, the list of potential target enclosures is exhausted, the highest ranked healthy enclosure is selected in Step 112, and the selection logic passes to the second selection phase.

The second selection phase begins in Step 114, where for each storage controller in the selected healthy drive enclosure, a Controller Selection (or Routing) 119 Key (CRK) is constructed (CRK={DK, CI_i}) using the Data Key (DK) and the Controller ID (CI).

These values are hashed in Step 116 and a sorted list 118 of potential storage controllers in the enclosure is generated in Step 120.

In Step 122, the logic makes a decision on whether all storage controllers in the selected enclosure are processed and represented in the list 118. Once the hashes are computed in Step 120 for all storage controllers associated with the selected drive enclosure, a storage controller with the highest hash value and known to be a healthy storage controller (by the cluster membership protocol) is selected in Step 124 from the sorted list 118. If however in Step 122, the logic decision in that there are storage controllers still left in the selected drive enclosure to be hashed, the procedure returns to Step 114.

On conclusion of the two-step selection routine, a two-dimensional selection key is generated in Step 126 that identifies the drive enclosure where a block of data will exist, and the primary storage controller that will manage the data.

The subject selection method generates a uniformly random distribution of objects across the storage system (i.e., across available drive enclosures) and across available storage controllers within each drive enclosure. Selection decisions require no explicit communication with distributed storage entities (enclosures or storage controllers), and clients can arrive at the same result selection result for a specific object independently without coordination or communication with the storage entities. This method is sufficiently generic in that it can handle changes in the healthy sets of drive enclosures or data storage controllers (in contrast to mod-based hashing methods) and can route and uniformly distribute data across arbitrarily sized sets of storage resources.

The subject selection routine supports distributed data protection schemes. Specifically, the object replication may be achieved in the subject system by selecting more than one storage entity from the list 108 or 118 of the sorted key values. For example, as shown in FIG. 4, illustrating the subject replication scheme for at least two copies of the object across a set of drive enclosures, the logic selects at least two highest ranked members from the sorted key list for the potential drive enclosures and attempts to place the object on the selected two enclosures (if they are healthy).

As presented, the Steps 150-158 of the replication routine shown in FIG. 4 are similar to Steps 100-110 of the Routing/Selection Routine shown in FIG. 3. However in Step 160 (in FIG. 4), the selection sub-system 34 selects N (at least 2) highest ranked healthy drive enclosures from the sorted list 108.

A similar policy can be used for mirroring the data object across storage controllers within each selected enclosure. For this phase of the replication process, shown in FIG. 4, Steps 162-168 are similar to Steps 114-122 of the Routing/Selection process shown in FIG. 3. However, in Step 170 of the replication process shown in FIG. 4, the logic selects N (at least two) highest ranked healthy storage controllers from the sorted list 118 to mirror the data object across the selected N storage controllers.

Data redundancy schemes that rely on parity or erasure codes are supported in the subject system. Such capability is supported by clients accumulating parity and log-structured data objects in a two-dimensional matrix 180 (shown in FIG. 2B) with the drive enclosures constituting one dimension while the storage controllers in the drive enclosure constitute the other dimension. Bulk data, for example, fragments $62_A$, $62_B$, $62_C$, are added into the matrix 180, and the parity 64A is generated using the matrix 180 to ensure there is no chance of collision for bulk data (shards) 62 and data protection (parity) fragments 64.

Selection and Data Placement within a Drive Enclosure

In the subject system 10, data storage devices 26 are segmented into pools $50_0$, $50_1$, ..., $50_N$ within each drive enclosure 60. Pools $50_0$, $50_1$, ..., $50_N$ may alternatively be presented as a set of logical storage partitions 54, 56, and/or 58 (shown in FIGS. 1A-1B, 5, 6, 7 and 8) that are carved out of each physical storage device 26.

For example, if a storage enclosure 60 includes 48 storage devices, it may be desirable to have 96 or 192 distinct logical storage partitions 54, 56, 58 on these 48 devices. Each partition 54, 56 on the physical device 26 is created by splitting the LBA space into the required number of device partitions (for example, two partitions for the case of 96 logical partitions, or four partitions for the case of 192 logical partitions).

If multiple storage controllers exist with a drive enclosure, each drive enclosure is assigned management capabilities for one or more storage pools. This capability grants each storage controller exclusive rights to mutate data on the storage pool it is assigned to. Other storage controllers within the same drive enclosure can read data from other storage pools which have not been granted data management capabilities.

Storage controllers within the same drive enclosure can route and access data on storage pools owned by different storage controllers within the same drive enclosure. Given a request to access data within a single drive enclosure but on a different (foreign) storage controller, the foreign controller can convert and interpret the request so that it can access the requested data. This requires converting the object identifier into the correct LBA address on the foreign controller.

Referring to FIGS. 5-8, shown is the subject system 10 instantiation with two drive enclosures ($60_0$ and $60_1$), two storage controllers ($32_0$ and $32_1$) per drive enclosure, and four storage devices 26 per each drive enclosure, with each storage device 26 partitioned, for example, in half (partitions 54, 56).

This setup of the subject system enables several properties:

Each storage controller has an exclusive mutation access to its storage pool. The capability can only be revoked on a drive enclosure membership list or the storage controller ejection change (which is a rare event).

Storage controllers can read any data from any other pool in the drive enclosure. This allows multiple paths to the storage devices in the enclosure for redundancy and performance use cases. The selection and data placement protocol does not protect data consistency, and it is the responsibility of the user of the storage controller and drive enclosure to guarantee no conflicts are possible (if that level of data consistency is desirable).

Figure 5:
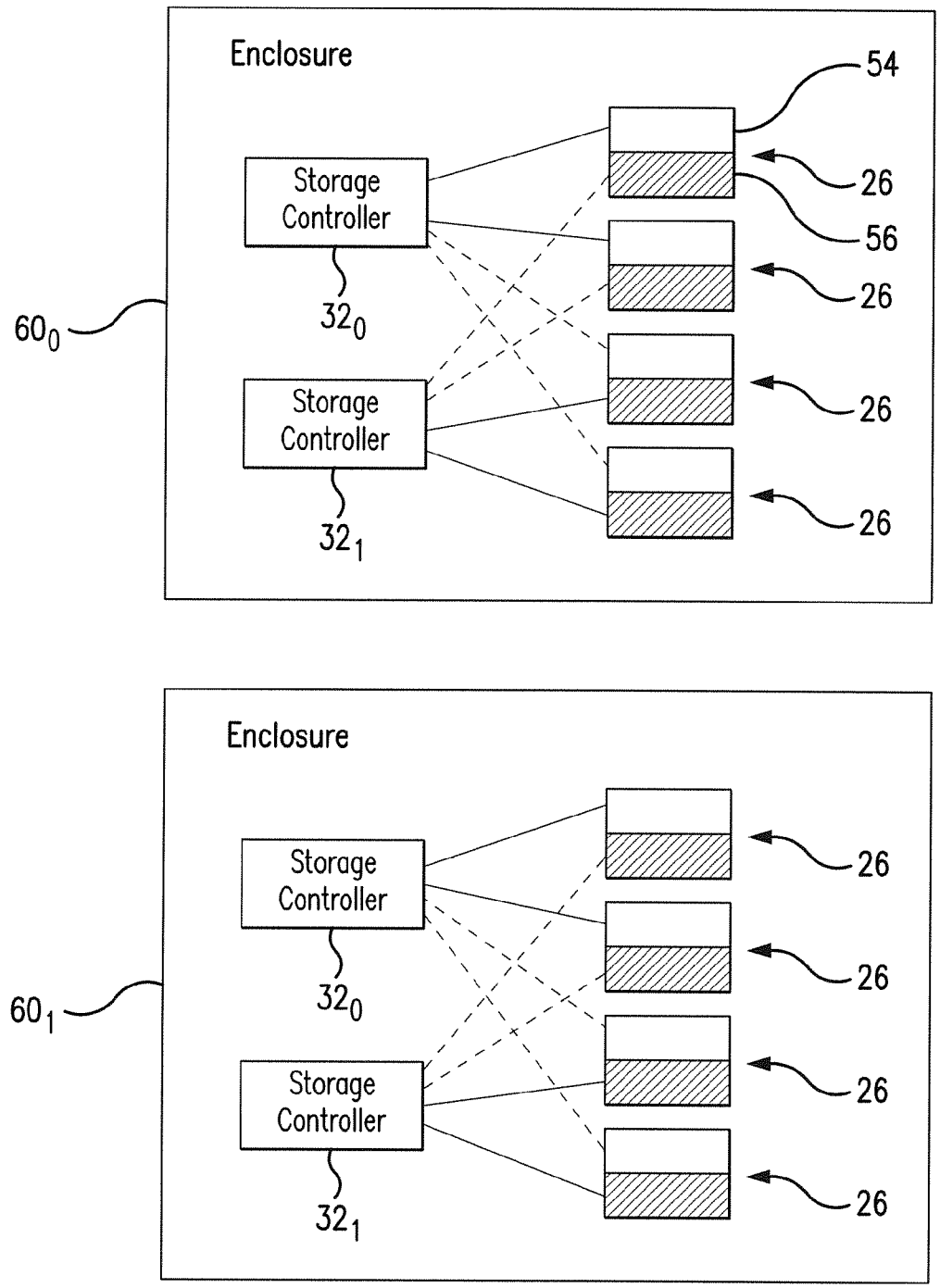
FIG. 5 is a simplified representation of the subject system with two drive enclosures and four storage devices per each drive enclosure.

As shown in FIG. 5, each storage controller $32_0$, $32_1$ has primary data paths (solid lines) for each device that logically permit read-write access to the devices 26. Each storage controller $32_0$, $32_1$ also has secondary paths (dashed lines) that logically permit read-only access. The storage controller can acquire or relinquish read-write capabilities on secondary paths through membership changes.

Figure 6:
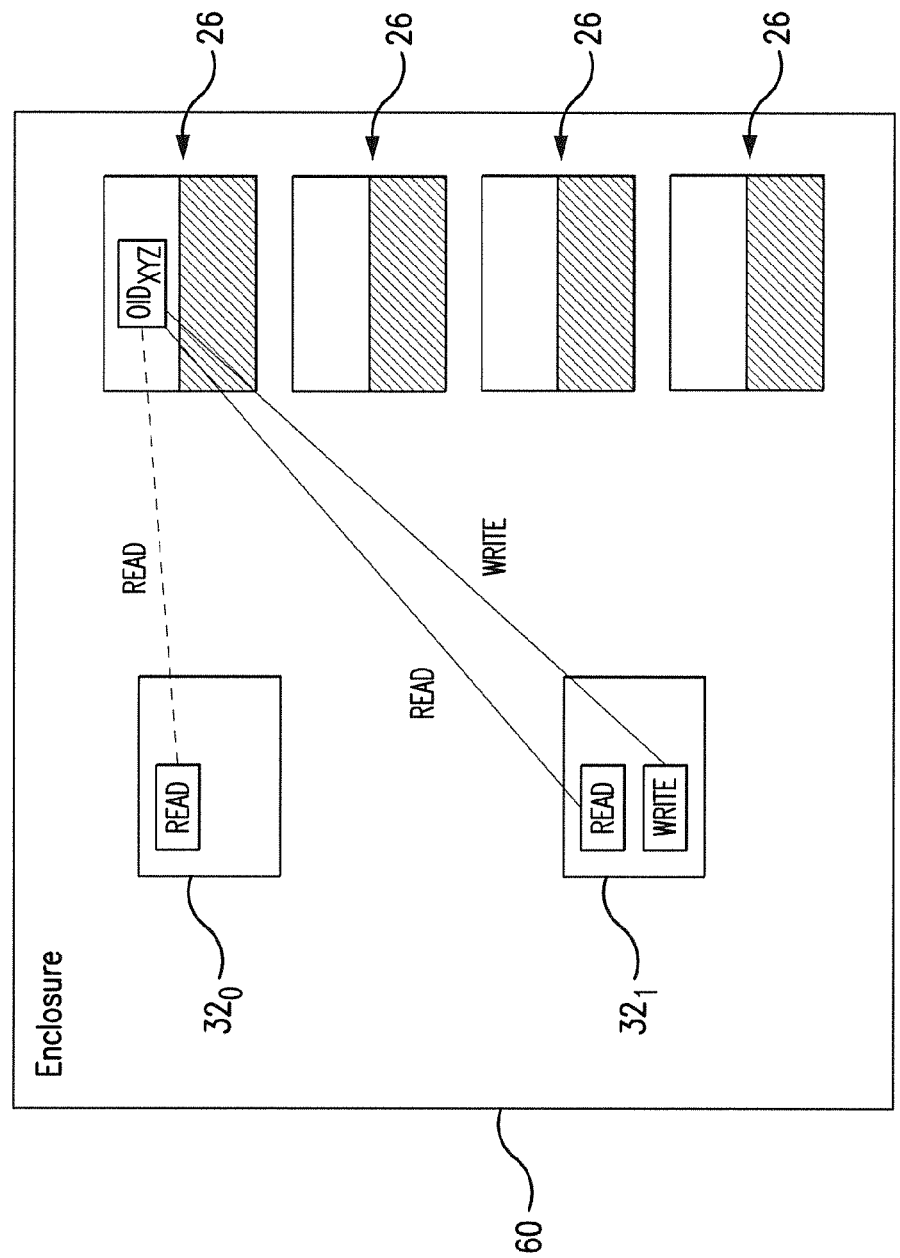
FIG. 6 is a representation of the subject addressing scheme for an object in a drive enclosure.

As shown in FIG. 6, for the Drive Enclosure 60, there are two access addresses available for reading the object $OID_{XYZ}$ (i.e., both storage controllers $32_0$ and $32_1$ can read the object $OID_{XYZ}$), but only one address is available for writing/mutating the object (only the storage controller $32_1$ has access to the address for writing/mutation).

Figure 7:
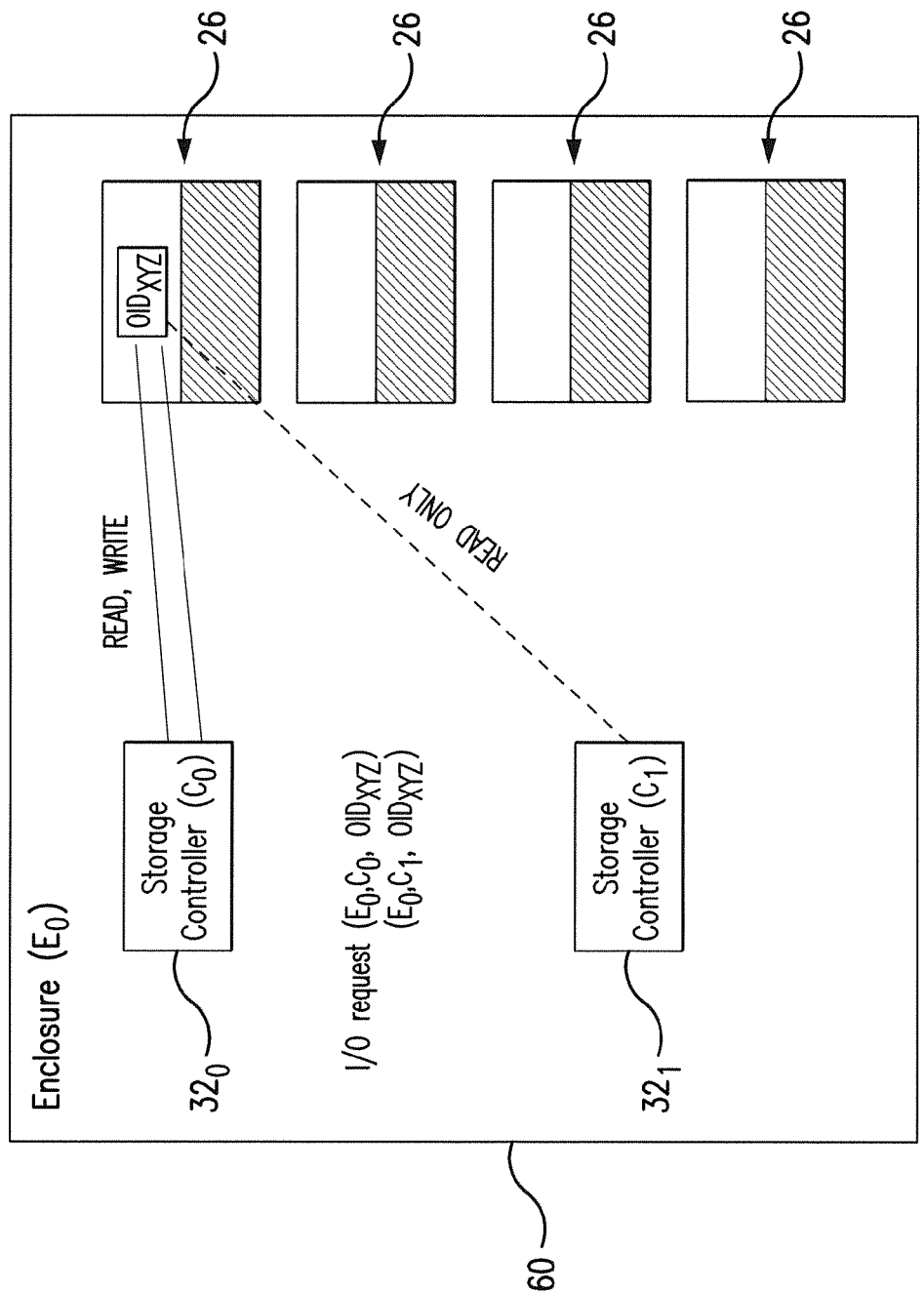
FIG. 7 is a representation of the subject mechanism for an object access in a failure-free, healthy, drive enclosure.

As shown in FIG. 7, illustrating the object access protocol in the failure-free healthy enclosure 60 ($E_0$), upon receipt of the IP request, the object $OID_{XYZ}$ can be mutated only by the storage controller $32_0$, and can be read from both storage controllers $32_0$ and $32_1$.

Controller Failover

The subject selection method enables multiple paths to data during failure scenarios while requiring no communication between storage controllers on the primary data path.

Upon occurrence of a failed storage controller and a successful membership change in the set of healthy storage controllers, data can still be written to and read from the failed controller's storage pool. For the storage controller failure scenario, a client generating requests to the storage controller runs the two-step selection process to identify the primary storage controller. Once the primary controller $32_0$ is identified, it should be determined that it failed. The selection algorithm selects a replacement healthy storage controller $32_1$ in the same enclosure (with the failed storage controller) using the sorted list 118. Upon conclusion of the two-step selection process, the subject routine identified an alternative path for the replacement storage controller $32_1$ in the context of the distributed storage system.

Subsequently, the data request arrives at the replacement controller (within the same drive). The replacement storage controller $32_1$ identifies the request as a "foreign I/O request" (similar to a situation where the I/O request is handled by a different controller in a failure free system). The replacement controller $32_1$ translates the IO request data placement and address information, and executes the I/O request. Subsequently, the data is placed into the storage pool of the failed storage controller $32_0$ but through the alternative (replacement) controller $32_1$.

Figure 8:
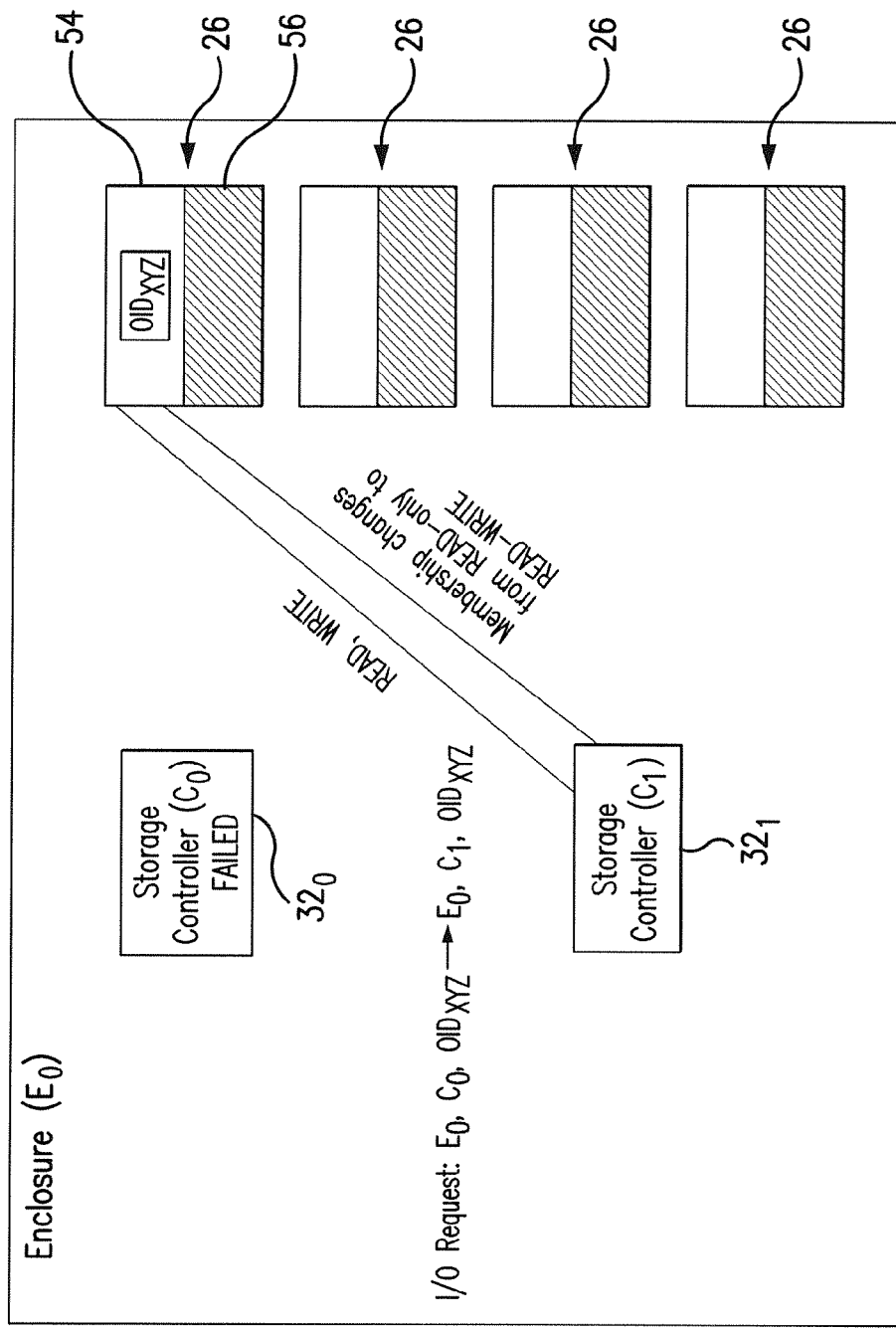
FIG. 8 is a representation of the subject mechanism for an object access when one of the storage controllers has failed.

On a storage controller node failure, the other nodes can assume the duties of the failed node by writing data on behalf of the failed node and selecting the storage pool using the failed nodes ID. Referring to FIG. 8, illustrating the routine for the object access when the storage controller $32_0$ failed, the "read" and "write" accesses are handled by the replacement storage controller $32_1$, which acquires "write" capabilities of the storage controller $32_0$ to the partitions 54, 56 on the storage device 26 using a membership change.

Once the failed controller is active and healthy again (and the membership of the system is correctly updated), the "foreign IO request" data can be correctly handled and routed by the primary controller.

If a device 26 fails, then the storage controller node can rebuild the missing data and place it on any other device 26 in the same storage pool 50.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is claimed is:

1. A method for data migration between compute nodes and data storage devices, comprising:
   (a) establishing at least a first and at least a second drive enclosures;
      operatively coupling a plurality of storage controllers in at least a first set of storage controllers and at least a second set of storage controllers;
      operatively coupling a first group of data storage devices to said at least first set of storage controllers and a second group of data storage devices to said at least second set of storage controllers;

operatively connecting at least one compute node to said at least first and second sets of storage controllers; and incorporating said at least first set of storage controllers and said first group of data storage devices connected thereto in said at least first drive enclosure, and incorporating said at least second set of storage controllers and said second group of data storage devices connected thereto in said at least second drive enclosure;

(b) in each of said first and second groups of data storage devices, separating the data storage devices in a plurality of isolated storage pools;

(c) in each of said at least first and second sets of data storage controllers, appointing each of the data storage controller in each of said at least first and second sets thereof to a respective storage pool from said plurality of the storage pools of the data storage devices, said appointed data storage controller having an exclusive right to write to said respective storage pool;

(d) generating, at said at least one compute node, at least one data set including at least a first fragment and at least a second fragment, and issuing a first "write" request for a said at least first fragment, and a second "write" request for said at least second fragment of said at least one data set;

(e) performing a multi-step selection routine including at least a first phase and at least a second phase, selecting a target drive enclosure in said at least first phase through the steps of:

assigning a Data Key (DK) for at least one of said first and second fragments generated by said at least one compute node, building an Enclosure Routing Key ERK={DK, $E_i$} for each drive enclosure from said plurality thereof, computing a hash value for said Enclosure Routing Key of said each drive enclosure, forming and sorting a first list of said hash values of said plurality of drive enclosures, and selecting, from said first sorted list, said target drive enclosure as a healthy drive enclosure having the highest hash value in said first sorted list; and in said at least second phase, selecting within said selected target drive enclosure a first target data storage controller for servicing said first "write" request for said at least first fragment of said at least one data set, and selecting a second target data storage controller for servicing said second "write" request for said at least second fragment of said at least one data set;

(f) receiving, at said first and second selected target data storage controllers, said first and second "write" requests, respectively;

(g) determining, at said first and second selected target data storage controllers, respectively, first and second respective storage pools from said plurality thereof assigned respectively to said first and second selected target data storage controllers, respectively; and (h) writing said at least first fragment to said first storage pool, and writing said at least second fragment to said second storage pool in a non-collision fashion.

2. The method of claim 1, further comprising:

in said step (a), operatively coupling a selection sub-system to said at least one compute node, said selection sub-system being configured for performing, in said step (e), said multi-step selection routine.

3. The method of claim 1, further comprising:

subsequently to said healthy drive enclosure selection, performing said second phase of said selection routine by:

constructing a Controller Routing Key CRK={DK, $CI_i$}, using the Data Key (DK) and the Storage Controller identification Code (CI), computing a hash value for each data storage controller in said selected drive enclosure, forming and soiling a second list of the hash values for said data storage controllers in said selected drive enclosure, and selecting, from said second sorted list, a healthy data storage controller having the highest hash value in said second sorted list.

4. The method of claim 3, further comprising:

for a respective one of said at least first and second fragments, performing an object replication routine by:

selecting at least two healthy highest ranked data storage controllers from said second sorted list of data storage controllers in said selected drive enclosure, and routing said at least one respective fragment to said at least two data storage controllers.

5. The method of claim 3, upon completion of said second phase of said multi-step selection routine, generating a two-dimensional selection matrix identifying, for said at least one of said first and second fragments, the target drive enclosure and the data storage controller managing the routing of said at least one fragment to said respective storage pool appointed to said selected data storage controller.

6. The method of claim 5, further comprising:

adding said at least first and second segments of said at least one data sets to said two-dimensional matrix, wherein said two-dimensional selection matrix includes a first dimension constituting said at least first and second drive enclosures, and said second dimension constituting said data storage controllers, and generating uniform random distribution of said at least first and second fragments of said at least one data set, and any derivatives thereof, across said plurality of drive enclosures and across said data storage controllers in said two-dimensional matrix in a non-collision fashion.

7. The method of claim 5, further comprising:

upon determining the failure of a target data storage controller, selecting, in said step (e), a replacement healthy data storage controller in the same drive enclosure with said target data storage controller from said second sorted list, assigning said replacement data storage controller for said storage pool assigned to said failed target data storage controller, and executing said "write" request to said storage pool of said target data storage controller by said replacement data storage controller.

8. The method of claim 1, further comprising:

for a respective one of said at least one first and second fragments, performing an object replication routine by:

selecting, from said first sorted list of drive enclosures, at least two healthy highest ranked drive enclosures, and routing said respective fragment to said at least two drive enclosures.

9. The method of claim 1, further comprising:

in said step (b), separating each physical data storage device in at least two logical storage partitions of a predetermined size, and building each storage pool from a set of the logical storage partitions formed on physical data storage devices, wherein each said logical partition is formed by splitting an LBA (Logical Block Address) space of said each data storage device into a predetermined number of said logical partitions.

10. The method of claim 1, further comprising:
including a first and a second data storage controllers in the same drive enclosure, and
upon receipt, at the first data storage controller, of said first "write" request to access an object in a storage pool assigned to the second data storage controller, converting, by said first data storage controller, said object identifier into a corresponding LBA of the storage pool assigned to said second data storage controller.

11. The method of claim 1, further comprising:
in said step (b), separating said data storage devices into said isolated storage pools using an address scheme where an address range for said each data storage controller ranges from $(M/N \times C)$ to $((M/N \times (C+1))-1)$, where M is the total number of addresses available on said data storage devices in said each of said at least first and second groups, N is the number of data storage controllers in each of said at least first and second sets thereof, and C is the index of a storage controller.

12. The method of claim 1, wherein said at least one data storage controller is configured to write said respective fragment exclusively to said respective storage pool, and to read data from any of said storage pools.

13. The method of claim 1, wherein said at least one data set is a parity stripe, wherein said at least one first fragment is a data block, and said at least one second fragment is a parity block, further comprising:
assigning, in said step (b), each of the data storage controllers a respective identification code,
in said step (d), assigning, by said at least one compute node, said at least one parity stripe a Parity Group Identifier (PGID), and
in said step (g), computing, by said at least one data storage controller, the modulus of the sum of said PGID of said at least one parity stripe and said identification code of said at least one selected data storage controller, and determining said respective storage pool based on said modulus computation.

14. The method of claim 13, further comprising:
if at least one data storage device containing said respective fragment fails, rebuilding said missing respective fragment of said at least one parity stripe, using the rest of said data and parity blocks of said at least one parity group, each written in respective storage data devices in different respective storage pools, and
placing said rebuilt fragment on another data storage device in said respective pool.

15. The method of claim 13, further comprising:
if said at least one selected data storage controller fails, assuming duties of said at least one failed selected data storage controller by another replacement data storage controller in the same drive enclosure,
in said step (h), writing, by said replacement data storage controller, said respective fragment of said at least one parity group on behalf of said failed data storage controller, and
selecting, in said step (e), said respective storage pool using said identification code of said failed data storage controller.

16. A system for data migration between compute nodes and data storage devices, comprising:
(a) a plurality of compute nodes, each compute node being configured for generation of at least one parity stripe, including a plurality of data fragment and at least one parity fragment, and assigning each said at least one parity stripe a Parity Group identifier (PGID), and issuing a first "write" request and a second "write" request for said first and second fragments, respectively, for writing into said data storage devices;
(b) a plurality of drive enclosures, operatively coupled to at least one compute node from said plurality thereof, each drive enclosure including a plurality of storage controllers, and a plurality of data storage devices operatively coupled to said storage controllers,
wherein the data storage devices in each of the drive enclosures are separated into a plurality of isolated storage pools, each containing a respective portion of the data storage devices contained in said each drive enclosure, and
wherein each of storage controllers is assigned a respective identification code and is appointed to exclusive writing into a respective one of said plurality of storage pools; and
(c) a selection sub-system operatively coupled to said at least one compute node, and said plurality of drive enclosures, and configured to perform a multi-step selection of a first and second data storage controllers, respectively, for servicing said first and second "write" requests issued by said at least one compute node, respectively,
wherein said selection sub-system operates to select a healthy highest ranked drive enclosure from said plurality thereof, and to select in said selected enclosure, healthy highest ranked first and second data storage controllers for writing said first and second fragments into separate storage pools, assigned exclusively to said first and second data storage controllers, respectively, in a non-collision fashion, and
wherein, for selection of the drive enclosure, said selection subsystem is farther configured for:
building an Enclosure Routing Key ERK={DK, $E_j$} from a Data Key (DK) assigned to each of said first and second fragments BY said at least one computing node for each drive enclosure from said plurality thereof,
computing a hash value for said Enclosure Selection Key of said each drive enclosure,
forming and sorting a first list of hash values of said plurality of drive enclosures, and
selecting, from said first sorted list, said healthy storage enclosure having the highest hash value in said first sorted list; and
wherein, for selection of said first and second data storage controllers within said selected drive enclosure, said selection sub-system is further configured for:
constructing a Controller Routing Key CRK={DK, $CI_j$} using the Data Key (DK) and the storage controller ID (CI),
computing a hash value for each data storage controller in said selected drive enclosure,
forming and sorting a second list of the hash values for said data storage controllers in said drive enclosure, and
selecting from said second list, a healthy first and second data storage controllers having the highest hash value in said second sorted list to service said first and second write request in a non-collision fashion, and building a two-dimensional selection key identifying, for said first and second fragments, the target drive enclosure, and the first and second data storage controllers managing said first and second fragments routing, respectively.

17. The system of claim 16, wherein each data storage device is separated into at least two logical partitions of a predetermined size, and wherein each of said storage pool is built with said logical partitions formed on physical data storage devices, wherein each said logical partition is formed by splitting an LBA (Logical Block Address) space of said each data storage device into a predetermined number of said logical partitions.

* * * * *